United States Patent  [15] 3,688,577
Murphy, Jr. et al. [45] Sept. 5, 1972

[54] INSTRUMENT FOR INDICATING LIQUID LEVELS

[72] Inventors: Frank W. Murphy, Jr.; Buddy G. Sparks, both of Tulsa; Charles H. Lawrence, Broken Arrow; Donald R. Rickard, Tulsa, all of Okla.

[73] Assignee: Frank W. Murphy Manufacturer, Inc., Tulsa, Okla.

[22] Filed: July 27, 1970

[21] Appl. No.: 58,595

[52] U.S. Cl.................................................73/299
[51] Int. Cl.............................................G01f 23/14
[58] Field of Search............73/299, 410; 137/270.5

[56] References Cited

UNITED STATES PATENTS 2,382,695  8/1945  De Giers.....................73/299
1,946,175  2/1934  Murphy.......................73/299
1,625,044  4/1927  McKeown..................137/329.3

Primary Examiner—Louis R. Prince
Assistant Examiner—Denis E. Corr
Attorney—Kimmel, Crowell & Weaver

[57] ABSTRACT

An instrument for indicating the level of a volatile liquid in a reservoir formed of a casing, a bellows so disposed in the casing as to provide a space between the casing and the bellows, an inlet conduit extending through a side of the casing into the space which connects the casing with the reservoir, an outlet extending from the space through the top of the casing which is normally closed but is openable to atmosphere, and a connection between the bellows and an indicating device.

6 Claims, 6 Drawing Figures

PATENTED SEP 5 1972

INVENTORS
FRANK W. MURPHY JR.
BUDDY G. SPARKS
CHARLES R. LAWRENCE
DONALD R. RICKARD

BY

Kimmel, Crowell & Weaver
ATTORNEYS 3,688,577

INSTRUMENT FOR INDICATING LIQUID LEVELS

BACKGROUND OF THE INVENTION

1. Field of the Invention

This invention pertains to a measuring instrument and, more specifically, to a hydrostatic pressure type instrument for indicating a liquid level.

2. Description of the Prior Art

Liquid level indicating instruments are old and well known in the several arts, and these may take the form of, for example, the simple and non-complex sight glass type (which require no citation of references) or they may take a more complex type of apparatus such as that as is illustrated in the patent to Carmelo L. Muzzi, U.S. Pat. No. 2,741,123. In the latter patent, the instrument utilized to determine the quantity of liquid present in the storage receptacle requires that at least three forces be involved, namely, the force of gravity of the liquid to be measured, the force of gravity of mercury, and the force of a reactive spring which is applied at a focus. Normally, the several forces are in a static equilibrium, and a change in one force will cause the other forces to exert a dynamic force equal to the magnitude of this change, and the change is reflected by appropriate indicating means. Regardless of the simplicity or complexity of the prior art devices, and disregarding costs of manufacture and installation, all of the prior art instruments of a related type are notorious in their failure to yield the observer an accurate reading. This becomes a serious problem, especially when it becomes necessary to read the liquid level of flammable materials which are held in bulk storage reservoirs.

Many extremely hazardous conditions have been created most recently because bulk storage reservoirs for gasoline have been over-filled thereby causing the flammable and explosive liquids to slosh over the tank to follow normal drainage. In the state of Oklahoma, several large fires have been caused and many thousands of dollars in damage have resulted. This was merely due to the fact that at night, or during icy conditions, the truck drivers negligently "forget" to make an actual gauge of the tank before delivering a bulk load. A new American Petroleum Industry code requires that a tank gauge of some type be installed on the bulk storage reservoirs to preclude such misadventures.

But no known prior art instrument has been heretofore devised which will provide the required reading with assurance that the reading will be accurate.

SUMMARY OF THE INVENTION

The instrument according to this invention is of non-complex construction. The instrument is adapted to be connected on a liquid storage reservoir in communication with the liquid contained therein. The fluid pressure in the tank is transmitted through an appropriate tube to a housing encasing a bellows, and the fluid pressure acting on the bellows creates a force (in opposition to a biasing means) which is applied to an actuating rod connected with the bellows. The bellows movement, in contracting under the fluid force, provides the rod with a linear movement to a rotating movement. The rotating movement or assembly is connected with a pointer shaft, and the pointer shaft rotates throughout an arc above scale indicia to give a "read-out" measured in feet. The "read-out" is calibrated, vertically, from ground level to the desired upward liquid level above which it would be dangerous to fill the reservoir. The construction of the instrument is such as to reduce hysteresis to a minimum.

Pressure responsive bellows type instruments are old and well known. However, the accuracy of such instruments, especially those employed in connection with volatile liquids, is open to material question since the gases generated in such apparatus will expand and contract as a consequence of the ambient temperature and this, in turn, gives erroneous readings to the instrument. In the present invention, means is provided to vent the bellows chamber or housing to preclude erroneous instrument readings.

It is a further object of this invention to provide an instrument of the type generally referred to above which is extremely accurate, noncomplex in construction and assembly, inexpensive to manufacture and maintain, and which is rugged and durable in use.

Other and further objects and advantages of the instant invention will become more manifest from a consideration of the following specification when read in light of the annexed drawings.

DESCRIPTION OF THE PREFERRED EMBODIMENT

Figure 1:
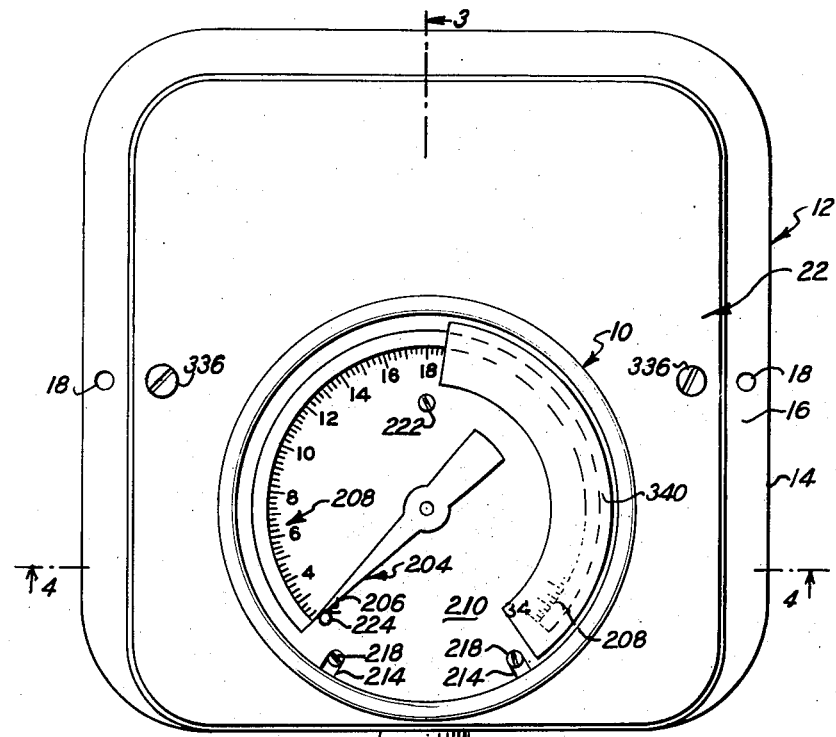
FIG. 1 is a front plan view of the liquid level indicating instrument according to this invention.

Referring now more specifically to the drawings, reference numeral 10 generally designates a hydrostatic liquid level indicator constructed in accordance with the teachings of this invention. The instrument 10 is, as is seen in FIGS. 1 and 2, enclosed within a housing 12 having a cover member 14 for the front side thereof.

The housing 12 includes a substantially rectangular base plate 16 having mounting openings 18 extending transversely therethrough at the marginal edges thereof adjacent each of its opposed sides, the openings being adapted to receive conventional fastening means. Spaced inwardly from the openings 18 and integrally formed with the base plate 16 is a laterally projecting continuous side wall 20 which, when taken with the base plate 16, forms a forwardly opening hollow substantially rectangular compartment 22. Integrally formed with the base plate 16, and adjacent the lower end of the side wall 20, is a vertically elongated solid and substantially rectangular boss 24. A vertically elongated substantially rectangular mounting plate 26 is fixedly connected on the boss 24 by conventional means (not shown), and as is seen in FIG. 2 of the drawings, the mounting plate 26 includes an upper extension 26A which extends beyond the adjacent upper end of the boss 24.

Reference numeral 28 denotes a vertically elongated substantially hollow coupler which may be welded or otherwise secured to the lower end of the boss 24 by conventional means (not shown). As is seen in FIGS. 1 and 2, the lower end of the coupler 28 extends through an opening 30 formed in the lower end of the side wall 20. The lower end of the coupler 28 is adapted to be connected on the wall of the reservoir in which the liquid is contained, the level of which is to be determined, by suitable fittings 32 and a connecting conduit 34. The fittings 32 and the reservoir connecting conduit 34, it will be understood, place the instrument 10 in open communication with the interior of the reservoir.

Figure 3:
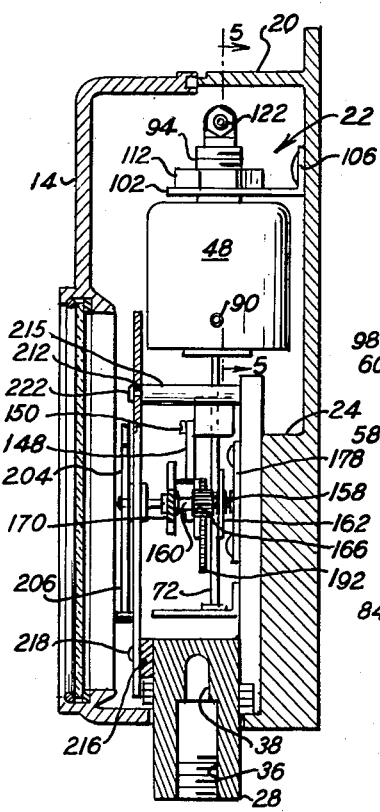
FIG. 3 is a detail cross-sectional view, FIG. 3 being taken substantially on the vertical plane of line 3—3 of FIG. 1, looking in the direction of the arrows, the connector fittings being omitted from this Figure.
Figure 2:
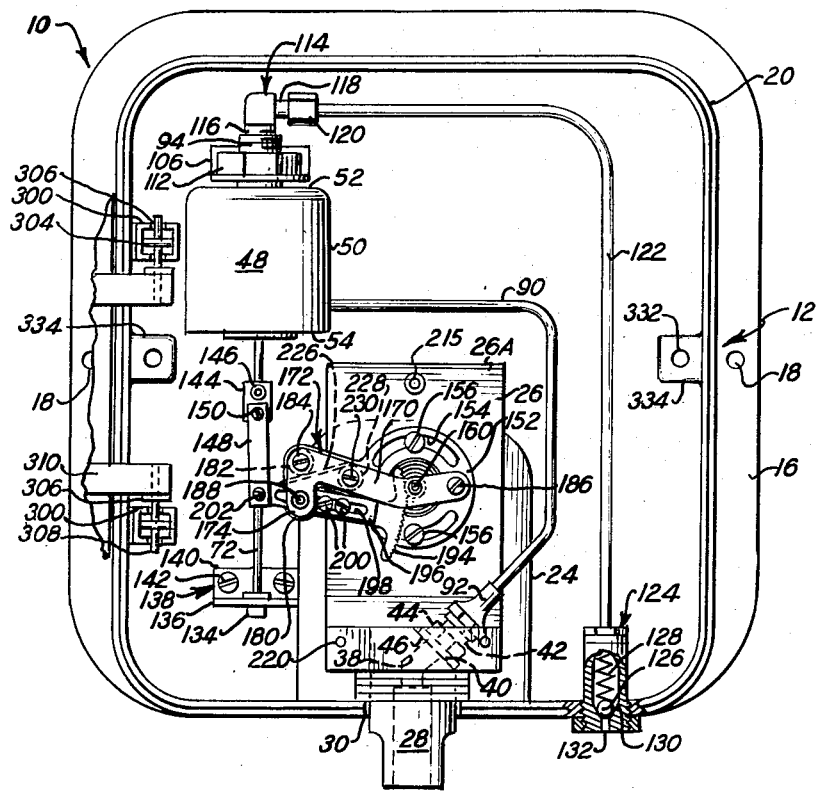
FIG. 2 is a front plan view of the instrument, the cover member therefor having been moved to its open position, and the indicating arm and the dial plate of the instrument having been removed.

The lower end of the coupler 28 includes a normally upright liquid passage 36 (see FIG. 3), and the upper end of the passage 36 is in open communication with the lower end of an upwardly inclined hollow bore 38 which opens into the plane of the inclined side 40 formed at the upper end of the coupler 28 (see FIG. 2). Threaded into the upper end of the bore 38 is a hollow nipple 42 (see FIG. 2) which is held against inadvertent displacement by the conventional lock nut 44 and washer 46.

Figure 5:
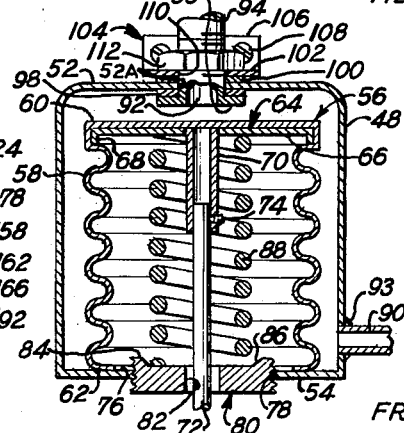
FIG. 5 is a fragmentary detail cross-sectional view, FIG. 5 being taken substantially on the vertical plane of line 5—5 of FIG. 3, looking in the direction of the arrows.
Figure 6:
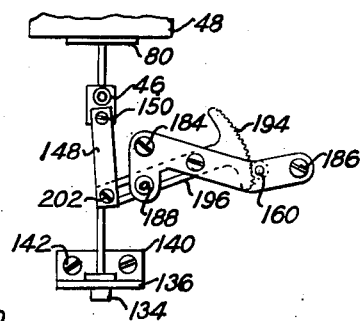
FIG. 6 is a fragmentary detail front elevational view of the motion translating assembly.

Reference numeral 48 denotes a casing for a conventional bellows type liquid pressure responsive device, the casing including a substantially cylindrical side wall 50, and top and bottom walls 52, 54, respectively. The bellows unit here bears the reference numeral 56 disposed within the casing 48, the unit including expandable and collapsible cylindrical side wall 58 and top and bottom walls 60, 62, respectively. As is seen in FIG. 5 of the drawings, the bottom wall 62 engages and is secured on the bottom wall 54 of the casing 48, and is seated thereon by conventional means, not shown. The cylindrical side wall 50 is disposed in an upright position with the top wall 60 of the unit 56 being disposed in juxtaposition relative to the top wall 52 of the casing 48. The bellows casing side wall 50 and its top and bottom walls 52, 54, respectively, are formed of any suitable material, and in the event the instrument 10 is to be used to indicate the liquid level of gasoline disposed in a suitable reservoir, the bellows unit 56 is formed of beryllium copper or steel. Other materials may be substituted therefor, however.

Reference numeral 64 denotes, in general, a reinforcing member for the top wall 60 of the bellows unit 56. The reinforcing member includes a substantially flat thin discoidal wall 66 conforming to the configuration of the top wall 60 and is coextensive therewith. Depending from the wall 66 and preferably formed therewith is a depending circumferential flange 68. Also depending from the discoidal wall 66 and substantially centrally thereof is an integrally formed or otherwise rigidly secured substantially hollow tubular sleeve 70. The sleeve 70 is adapted to receive the upper end of an elongated shaft 72 releasably secured in the sleeve 70 as by a set screw 74. The lower and other end of the shaft 72 is extended through an opening 76 formed centrally in the bottom wall 62 and which is coaxially aligned with a tapped opening 78 formed in the bottom wall 54 of the casing 48. As is seen in FIG. 5, the diameter of the opening 76 is greater than the diameter of the tapped opening 78. Threaded into the tapped opening 78 is an annular plug 80 having a centrally located opening 82 extending transversely therethrough to loosely receive the lower end of the shaft 72 therethrough for reciprocation therein. The plug 80, at its inner end, is provided with an integrally formed upwardly projecting cylindrical flange 84 to provide a spring seat 86 for one end of a helicoidal spring 88 which circumscribes the upper end of the shaft 72, the sleeve 70, and has its other end abutting against the discoidal wall 66. The arrangement is such that the bellows unit 56 is constantly urged for movement to its expanded position within the casing 48.

The casing 48 is provided with fluid inlet means and outlet means, and the fluid inlet means here comprises an elongated substantially hollow tubular conduit 90 which may be formed of a "Polyflow" type tubing or of a stainless steel. One end of the conduit 90 extends through the side wall 50 and is in open communication with the interior of the casing 48, and the other end thereof connects via an appropriate fitting 92 with the upper end of the nipple 42. Conventional means 93, welding for example, may be used in connecting the conduit 90 on the side wall 50.

To provide the fluid outlet means, the top wall 52 is formed with a centrally positioned transversely extending opening 52A which receives one end of a short length of pipe 94 therein, the inner end of the pipe 94 terminating in a laterally and outwardly turned integrally connected cylindrical flange 96. Interposed between the flange 96 and the adjacent side of the top wall 52 is an annular sealing element 98 formed of any suitable material.

Engaged over the pipe 94 and superimposed against the upper side of the top wall 52 is a spacer washer 100.

Reference numeral 102 designates an elongated substantially rectangular foot portion of a hanger bracket 104 having a leg section 106 fixedly connected to the base plate 16. The foot portion 102 is formed with a transversely extending opening 110 in which is received the upper end of the pipe 94 which projects thereabove. The upper end of the pipe 94 is threaded to receive a clamp nut 112 thereon which forcibly engages the foot portion 102 to clamp the same against the washer 100 and to thereby rigidly connect the casing 48 to the base plate 16.

The outlet means further includes an elbow connector 114 having one of its ends 116 threadedly connected with the upper end of the pipe 94, and its other end 118 connects by means of a conventional coupler 120 with one end of a bleeder conduit 122. The other end of the bleeder conduit 122 connects to the inlet side of a conventional one-way check valve 124 mounted on the lower end of the continuous side wall 20 and having an end extending therethrough. The check valve 124 includes a ball valve element 126 normally urged by the helicoidal spring 128 for seating against its valve seat 130 and having an outlet port 132 opening to the atmosphere.

As is seen in FIG. 2, the lower terminal end of the shaft 72 is journalled for reciprocation within a plastic bushing 134 mounted on the foot portion 136 of an L-shaped bracket 138 having an upright leg section 140 fixedly connected to the base plate 16 as by screws 142.

A connector block 144 is secured by a set screw 146 on the shaft 72. To serve a function to be described below, one end of an elongated substantially rectangular link 148 is connected on the connector block 144 by an adjustment screw 150, and the longitudinal axis of the link 148 may be preset at any desired degree of angularity desired relative to the longitudinal axis of the shaft 72. The other end of the link 148 depends from the connector block 144 to serve a function also to be described below.

Reference numeral 152 indicates a substantially flat cylindrical support plate having a plurality of arcuate slots 154 extending transversely therethrough. The cylindrical support plate 152 is releasably secured in an adjusted position on the mounting plate 26 as by screws 156 which extend transversely through the arcuate slots 154 and are threadedly received within the mounting plate 26. The support plate 152 is provided with a centrally located upwardly projecting hollow journal 158 which rotatably supports one end of an elongated substantially cylindrical shaft 160 therein. One end of a spiral spring 162 under tension is fixedly connected on the shaft 160, and its other end 162A is fixedly connected to a standard 164 having one of its ends fixedly connected on the support plate 152. The shaft 160 is integrally connected with a pinion 166, and the other end of the shaft 160 is rotatably journalled in a bearing 168 carried on the leg portion 170 of an L-shaped bracket 172. The L-shaped bracket 172 also includes a foot section 174. The L-shaped bracket 172 is spaced laterally from an L-shaped extension 176 which is integrally connected with the cylindrical support plate 152 and which projects from a portion of the peripheral edge thereof. The extension 176 includes a leg portion 178 and a foot section 180. The leg portions 170, 178 and foot sections 174, 180 extend parallel to one another, and at the junction of the leg portion 178 with its associated foot section 180 there is rigidly connected a laterally projecting standard 182 against which the junction of the leg portion 170 with the foot section 174 bears and which is secured thereon as by the screw 184 which is threaded into the outer end of the standard 182. The outer end of the leg portion 170 bears against the outer end of the standard 164 and is secured thereon as by the screw 186. Secured on and extending between the outer ends of the foot sections 174, 180 is a laterally projecting fulcrum shaft 188, to which further reference will be made below. Fixedly secured on the fulcrum shaft 188 is a cylindrical collar 190 and one end of an elongated lever 192 is journalled for rotation on the shaft 188 and bears against the collar 190. The other end of the lever 192 terminates in segment gear 194 which meshes with the pinion 166. A second or adjustable lever 196 having an elongated substantially rectangular slot 198 extending transversely therethrough is engaged against the outer side of the lever 192 for selective axial adjustment relative thereto. The lever 196 is held in a preselected adjusted position relative to the lever 192 as by the screws 200 which extend through the slot 198 for threaded engagement with the lever 192. As is seen in the several figures of the drawing, the lever 196 has an end thereof adapted to be pivotally connected to the lower end of the link 148 as by the pivot pin 202. As is seen in FIG. 2, the fulcrum shaft 188 extends transversely through the slot 198.

Fixedly connected by conventional means on the upper end of the shaft 160 is an indicator arm 204 having an end 206 which is adapted to sweep across scale indicia 208 carried on the outer side of a dial plate 210, the latter being cylindrical and being center mounted on the shaft 160 in which the shaft is free to rotate. The dial plate 210 is provided with an opening 212 spaced inwardly from its outer marginal edge and a pair of slots 214 remotely disposed therefrom. The dial plate 210 is supported on the upper end of the standard 215 and on the upper side of a crossbar 216 fixedly connected to the upper end of the coupler 28. A lower arcuate portion of the dial plate 210 rests on the crossbar 216 and is secured thereon by screws 218 which are threaded into openings 220 formed in the crossbar 216. A similar screw 222 is extended through the opening 212 and into the upper end of the standard 215. The screws 218 and 222 secure the dial plate 210 against movement.

A stop pin 224 projects laterally from the dial plate 210 and is disposed in the rotary path of movement of the indicator arm 204 in one direction of its travel. Rotary travel of the indicator arm 204 in its other direction is limited by a stop plate 226 (see FIG. 4) which includes an offset arm 228 which is fixedly connected to the leg portion 170 by conventional means 230. The stop plate 226 is disposed in the path of movement of the levers 192, 196 in a counterclockwise direction about the fulcrum shaft 188.

The housing 12 also includes means for hingedly connecting the cover member 14 thereon. These means comprise a pair of substantially hollow elongated posts 300 fixedly connected to the base plate 16 and to adjacent portions of the continuous side wall 20 at one side thereof, the posts 300 each housing a helicoidal spring 302. Each of the posts 300, at their respective outer ends, is traversed by a limit pin 304, and each post is formed with a pair of oppositely disposed slots 306 which are elongated in the direction of the longitudinal axis of the adjacent one of the springs 302.

Figure 4:
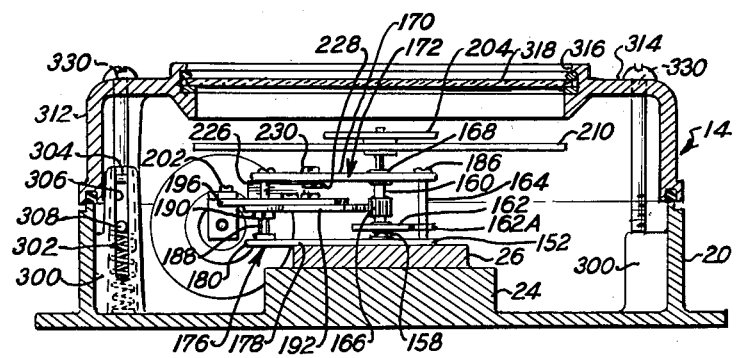
FIG. 4 is a detail cross-sectional view, FIG. 4 being taken substantially on the horizontal plane of line 4—4 of FIG. 1, looking in the direction of the arrows.

As is seen in FIG. 4 of the drawings, the outer ends of the springs 302 are adapted to abut crosspins 308, respectively, the crosspins 308 each being fixedly connected to the outer ends of a pair of levers 310, respectively. The inner ends of each of the levers 310 are fixedly connected to one side of a continuous flange 312 which projects laterally from a front plate 314, the front plate 314 and flange 312 comprising components of the front cover member 14. The front plate 314 is provided with a central opening 316 in which is fitted a transparent window 318, the window being secured in the opening 316 by means conventional in the art. The crosspins 308 are each slidably mounted for reciprocation within a pair of the slots 306, respectively, formed in the posts 300. As is seen in FIG. 2, each of the crosspins 308 extends substantially perpendicularly with respect to the adjacent one of the limit pins 304 and is disposed therebelow. The outer ends of each of the springs 302 in engaging, respectively, one of the crosspins 308, tend to constantly bias the same for movement in the direction of the limit pins 304. The front plate 314 is also provided with a pair of openings 330 which are aligned with tapped bores 332 formed in bosses 334 integrally connected with the base plate 16 and at the sides of the continuous side wall 20. The openings 330 and tapped bores 332 are aligned with one another and receive therein the elongated releasable securing bolts 336.

At 340 is indicated an arcuate opaque masking tape which may be placed across the upper range of the scale indicia 208. The masking tape 340 may be colored red (or any desired color) whereby the meter reader will be immediately informed that when the end 206 of the indicator arm 204 extends across the masking tape, the liquid reservoir is in danger of being overfilled.

The instrument 10 according to this invention is designed to indicate the liquid level of a liquid disposed in an above-ground bulk storage reservoir. The scale indicia 208 is calibrated in feet and increments thereof, although other standards of measurement could be used, if desired. As is seen in the drawings, the scale indicia extends through a range of from 2 to 34 feet. If the liquid level in the reservoir is less than 2 feet, the reservoir may be, for all practical purposes, considered as being empty and requires refilling. For practical purposes, most gasoline bulk storage reservoirs are not constructed to safely accept a liquid stand of much more than 34 feet, and this is the maximum level for which the instrument 10 is normally calibrated.

In the use of this instrument, the connecting pipe 34 is placed into communication with the reservoir (not shown) at a point 2 feet above its bottom wall, and with the 2 foot stand the stored liquid will be conducted from the reservoir through the connector conduit 34, the connector 28, fitting 92, and conduit 90 into the casing 48 to fill the latter and to pass through the outlet conduit 122 to the one-way check valve 124. This liquid exerts a force on the bellows unit 56 tending to effect the collapse of the same, but the force is resisted by the tension of the spring 88. The end 206 of the indicator arm 204 will, thus, coincide with the scale indicia "2."

In the handling of volatile liquids, especially in bulk, it is seldom possible to avoid entraining air and generating some gaseous component as the liquid is led from the reservoir to the instrument 10. The conditions of the prevailing ambient atmosphere, especially the temperature thereof, contribute to such formations. In the instrument 10 herein described and illustrated, it is always possible that the liquid (gasoline) disposed in the casing 48 may include a gaseous component and hence, under the given conditions, the instrument 10 may be providing an erroneous indication.

To ensure that there is a minimum of 2 feet of gasoline within the reservoir, the attending mechanic will insert the lead of a lead pencil through the outlet port 132 to unseat the ball valve 126. The liquid in the casing 48 and any gases therein will then bleed through the conduit 90 and the check valve 124 until all of the air and gas fumes are exhausted therefrom and a steady flow of liquid passes through the outlet port 132. The pencil lead is then removed and the valve 124 automatically closes.

The instrument 10 may then again be read, and if the arm 204 still indicates the numeral "2," the mechanic knows that there is a 2 foot stand of liquid in the reservoir.

If in making the above test, the liquid passes through the check valve 124 in spurts, or if no liquid passes therethrough at all, the mechanic will immediately be apprised of the fact that there is less than a 2 foot stand of liquid in the reservoir, despite the reading of the indicator arm 204, and that immediate steps must be taken to effect its refill.

As the reservoir is filled above the 2 foot level, the pressure thereof is transmitted to the bellows unit 56 causing the same to gradually collapse downwardly. This collapse causes the shaft 72 to move downwardly, reference being made to FIG. 1 of the drawings, and in a linear direction. The movement of the shaft 72 carries therewith the connector block 144 and the link 148 in the same direction.

This linear movement is now translated into a rotary movement, for the downward force of the link 148 is applied to the outer pivotally connected end of the lever 196 which turns about the fulcrum shaft 188 in a counterclockwise direction causing the lever 192 and its connected segment gear 194 to swing in the same direction, reference still being made to FIG. 1 of the drawings.

This rotary movement is transmitted to the pinion 166 causing ti to turn in a clockwise direction and to turn the indicator arm 204 and its end 206 in the same direction. The end 206 now sweeps over the indicia 208 as the reservoir fills towards its desired level.

When the end 206 registers approximately with the numeral "18," (the assumed desired liquid level height for the purpose of this explanation), the filling will be discontinued and an instrument reading will be taken after bleeding the bellows casing 48 in the manner described above. If the instrument now indicates less than "18" feet the filling may be continued until the desired level is obtained.

The masking tape 340 is used merely as a matter of convenience in association with the indicator arm 204. Some reservoirs will not accept a 30 foot liquid level, so in order to avoid having to provide a different instrument foe each tank, the tape may be constructed in various arcuate lengths for reservoirs having smaller capacities. As has been said above, the use of the tape 340 is optional and is merely a convenience to warn against overfilling.

Now as the liquid in the reservoir is dispensed, the pressure on the bellows unit 56 decreases enabling it to expand under the bias of its spring 88. This causes the shaft 72 to move linearly upwardly and moves the connector block 144 and its connect link 148 in the same direction. The levers 192, 196 will now pivot in a clockwise direction about the fulcrum shaft 188 causing the segment gear 194 to turn in the same direction. This drives the pinion 166 counterclockwise and its indicator arm in the same direction. Instrument readings may be taken at any time, as described above, during the depletion of the liquid from its reservoir in order to obtain a true liquid level measurement.

The use of the spiral spring 162 in this instrument lends accuracy thereto for it tends to prevent any lost motion between the segment gear 194 and the pinion 166. In the described embodiment of this invention, the spring 162 is wound as the segment gear 194 turns counterclockwise, the tension of the spring tending to resist this turning movement and maintaining the gear and pinion teeth in close mesh. In a similar manner, as the segment gear 194 turns clockwise, the bias of the spring 162 causes the shaft 160 to turn in the opposite direction so as to keep the pinion teeth closely engaged with the gear teeth.

The reading of the instrument 10 may be adjusted for accuracy through the simple expedient of loosening the screws 200 to permit the effective length of the lever 196 with respect to the fulcrum shaft 188 to be changed by shifting the lever 196 axially relative to the lever 192. With care, the adjustment may be accomplished so that the instrument will measure a liquid level within one inch of its actual height. Still further adjustments to the instrument and for effecting reading accuracy may be obtained by shifting the position of the connector block 144 on the shaft 72, and/or changing the angularity of the axis of the link 148 relative to the longitudinal axis of the shaft 72.

From a reading of the foregoing specification it will be immediately understood that the stop pin 224 coacts with the indicator arm 204 to prevent an overthrow of the segment gear 194 in a counterclockwise direction, reference being made to FIG. 2 of the drawings, which would cause the same to become disengaged from the pinion 166. If this should occur, the instrument 10 would, necessarily, have to be recalibrated.

In a similar manner, the stop plate 226, disposed in the path of movement of the levers 192, 196 in their counterclockwise direction about the fulcrum shaft 188, prevents the overthrow of the segment gear 194 causing the same to disengage from the pinion 166.

This instrument is further unique in that the spring 88 may be changed to provide a different tension of compression constant or value in order that the meter range may be made to vary according to the demand that is to be made thereon. This feature is of import, per se, but when taken into consideration with the adjustable linkage described above, it will be readily ascertained that the versatility of the meter is materially enhanced. It should also be noted that the instrument, meter or gauge according to this invention may be calibrated to read a minimum of zero or any other desired value. In the instant example, the 2 foot minimum was arbitrarily selected in view of the described embodiment and, of course, any slender object, other than the described pencil, may be used to operate the check valve.

Having described and illustrated one embodiment of this invention in detail, it will be understood that the same is offered merely by way of example, and that this invention is to be limited only by the scope of the appended claims.

What is claimed is:

1. An instrument for indicating the level of liquid contained in an above-ground storage reservoir having a lower end, said instrument comprising:
   support means;
   a casing, mounted on said support means, having a bellows so disposed therein as to provide a space between the casing and the bellows, said bellows being expandable and collapsible in a linear direction;
   an inlet conduit extending into the casing at a first location so as to be in communication with said space for connecting said liquid from the lower end of said reservoir with said space to effect increments of collapse of said bellows in the presence of liquid pressure;
   means in said bellows constantly biasing said bellows for expansive movement in opposition to said liquid pressure thereon;
   a first shaft fixedly connected with said bellows and movable therewith;
   a second shaft having an end journalled for rotation on said support means and an indicator arm fixedly connected, intermediate its ends, on said second shaft for rotation therewith;
   indicia mounted on said support means in juxtaposition relative to said indicator arm and positioned to be swept thereby;
   a fulcrum shaft having an end fixedly connected on said support means;
   a first lever having a pair of opposed ends with one of its said ends being pivotally connected on said fulcrum shaft;
   a segment gear carried on the other end of said first lever;
   a pinion on said second shaft meshing with said segment gear;
   means connecting said first lever with said first shaft;
   a one-way check valve biased to its closed position; and
   conduit means, extending from the casing at a second location that is above said first location so as to be in communication with said space, connecting said space with said one-way check valve.

2. An instrument as defined in claim 1 wherein:
said means connecting said first lever with said first shaft includes a second lever having a pair of opposed ends with one of its said ends being connected on said one end of said first lever; and
means connecting the other end of said second lever on said first shaft.

3. An instrument as defined in claim 2 and:
means for selectively adjusting the axial length of said second lever relative to the axial length of said first lever to selectively adjust the degree of rotation of said segment gear.

4. An instrument as defined in claim 3 wherein:
said selective adjusting means comprises providing said second lever with an axially extending slot to receive said fulcrum shaft therethrough; and
means extending through said slot for connecting said second lever on said first lever in an adjusted position.

5. An instrument as defined in claim 4 wherein:
said means connecting said other end of said second lever on said first shaft includes a connecting block axially adjustable on said first shaft;
means securing said block in an adjusted position on said first shaft;
a link having an end fixedly connected on said block and extending at a preselected angle of inclination relative to the longitudinal axis of said shaft; and
means pivotally connecting the other end of said second lever on the other end of said link.

6. An instrument as defined in claim 5 and:
resilient means connected on said support means and on said second shaft, said resilient means constantly tending to bias said second shaft for rotation in one direction.

* * * * *